United States Patent
Batra et al.

(10) Patent No.: US 9,593,237 B2
(45) Date of Patent: Mar. 14, 2017

(54) OLEFIN BLOCK COPOLYMER COMPOSITION WITH LOW TACK

(71) Applicant: Dow Global Technologies LLC, Midland, MI (US)

(72) Inventors: Ashish Batra, Zionsville, IN (US); Dana R. Breed, Gray, TN (US); Pradeep Jain, Lake Jackson, TX (US); Jose M. Rego, Houston, TX (US); Robert T. Johnston, Lake Jackson, TX (US); Alec Y. Wang, Sugar Land, TX (US); Jeffrey C. Munro, Bellaire, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/727,073

(22) Filed: Jun. 1, 2015

(65) Prior Publication Data

US 2015/0259524 A1 Sep. 17, 2015

Related U.S. Application Data

(62) Division of application No. 13/159,660, filed on Jun. 14, 2011.

(51) Int. Cl.
| | | |
|---|---|---|
| C08L 53/00 | (2006.01) | |
| C08L 23/04 | (2006.01) | |
| C08L 23/16 | (2006.01) | |
| C08L 91/00 | (2006.01) | |
| C08L 9/00 | (2006.01) | |
| C08L 23/06 | (2006.01) | |

(52) U.S. Cl.
CPC ............... *C08L 53/00* (2013.01); *C08L 9/00* (2013.01); *C08L 23/04* (2013.01); *C08L 23/06* (2013.01); *C08L 23/16* (2013.01); *C08L 91/00* (2013.01); *C08L 2205/03* (2013.01); *C08L 2207/062* (2013.01)

(58) Field of Classification Search
CPC .......... C08L 23/04; C08L 23/16; C08L 53/00; C08L 91/00; C08L 23/06; C08L 2205/03; C08L 2207/062; C08K 3/26
See application file for complete search history.

(56) References Cited

U.S. PATENT DOCUMENTS

| | | | |
|---|---|---|---|
| 7,608,668 B2 | 10/2009 | Li Pi Shan et al. | |
| 2006/0199911 A1* | 9/2006 | Markovich et al. | .......... 525/192 |
| 2006/0199930 A1 | 9/2006 | Li Pi Shan et al. | |
| 2006/0211819 A1 | 9/2006 | Hoenig et al. | |
| 2007/0112127 A1 | 5/2007 | Soediono et al. | |

FOREIGN PATENT DOCUMENTS

| | | |
|---|---|---|
| JP | 2000169640 A | 6/2000 |
| JP | 2005042009 A | 2/2005 |
| WO | 2005/090427 A1 | 9/2005 |
| WO | 2008067503 A1 | 6/2008 |

OTHER PUBLICATIONS

Fred W. Billmeyer, Jr, "Textbook of Polymer Science, 3rd Edition" John Wiley & Sons, Inc., New York p. 478 (1984).*
PCT/US2011/040266 International Search Report and Written Opinion mailed Aug. 29, 2011.
PCT/US2011/040266 International Preliminary Report on Patentability mailed Dec. 27, 2012.

* cited by examiner

*Primary Examiner* — Alexander Kollias

(57) ABSTRACT

Disclosed are oil-extended olefin block copolymer compositions with low, or no, tack. A unique comonomer content in the soft segment of the OBC in conjunction with the presence of a polyolefin provides the present oil-extended OBC composition with softness, low (or no) tack, and low (or no) oil-bleed.

7 Claims, 8 Drawing Sheets

34.6% gray scale 51.6% gray scale

Compression set (70°C)

OLEFIN BLOCK COPOLYMER COMPOSITION WITH LOW TACK

CROSS REFERENCE TO RELATED APPLICATIONS

This application claims priority to U.S. Patent Application Ser. No. 61/354,309, filed on Jun. 14, 2010.

BACKGROUND

Olefin block copolymers (OBCs) are useful for producing soft compounds such as soft-touch articles. OBCs find application in soft compounds such as overmolded grips because the block architecture of the OBC results in good tensile strength, compression set and temperature resistance. To make soft compositions (i.e., compositions with a low durometer value and/or a low Shore A hardness value), OBCs are mixed with an oil. When exposed to elevated temperature, however, these oil-extended compositions can exhibit tackiness. Tack is problematic because it produces undesirable haptics (stickiness) and/or undesirable surface appearance in articles fabricated from these compounds.

A need exists for oil-extended OBC compositions with low, or no, tack. A need further exists for an oil-extended OBC composition with low, or no, tack when exposed to elevated temperature for an extended period of time.

SUMMARY

The present disclosure is directed to oil-extended OBC compositions with low, or no, tack. The unique comonomer content in the soft segment of the OBC in conjunction with the presence of a polyolefin and a filler provides the present oil-extended OBC compositions with low, or no, tack.

In an embodiment, an oil-extended olefin block copolymer composition is provided and includes an olefin block copolymer. The olefin block copolymer contains hard segments and soft segments. The soft segments include from about 9 mol % to less than 15 mol % comonomer content. The composition also includes an oil, one or more polyolefin, and a filler. The composition has the following properties after exposure to 70° C. for one week (i) a tack force less than 0.1N, and (ii) a Shore A hardness from about 40 to about 90.

The present disclosure provides another composition. In an embodiment, an oil-extended olefin block copolymer composition is provided and includes an olefin block copolymer. The olefin block copolymer contains hard segments and soft segments. The soft segments include from about 9 mol % to less than 15 mol % comonomer content. The composition also includes an oil, one or more polyolefin, and a filler. The composition has the following properties after exposure to 70° C. for one week: (i) a normalized oil bleed index of less than 50, and (ii) a Shore A hardness from about 40 to about 90.

The present disclosure provides another composition. In an embodiment, an oil-extended olefin block copolymer is provided and includes an olefin block copolymer. The olefin block copolymer contains hard segments and soft segments. The soft segments include from about 9 mol % to less than 15 mol % comonomer content. The composition also includes an oil, a polyethylene, and a filler. The composition has the following properties after exposure to 70° C. for one week: (i) a tack force less than 0.013N and (ii) a Shore A hardness from about 40 to about 90.

The present disclosure provides another composition. In an embodiment, an oil-extended olefin block copolymer is provided and includes an olefin block copolymer. The olefin block copolymer contains hard segments and soft segments. The soft segments include from about 9 mol % to less than 15 mol % comonomer content. The composition also includes an oil, a polyethylene, an ethylene-propylene-diene monomer rubber (EPDM) and a filler. The composition has the following properties after exposure to 70° C. for one week: (i) a tack force less than 0.10N and (ii) a Shore A hardness from about 40 to about 90.

An advantage of the present disclosure is the provision of an oil-extended OBC composition with low tack, or no tack.

An advantage of the present disclosure is the provision of an oil-extended OBC composition with reduced, or no, oil-bleed.

An advantage of the present disclosure is the provision of an oil-extended OBC composition with softness, and/or low (or no) tack and/or low (or no) oil-bleed.

An advantage of the present disclosure is the provision of an oil-extended polyolefin that is halogen-free.

DETAILED DESCRIPTION

Figure 1:
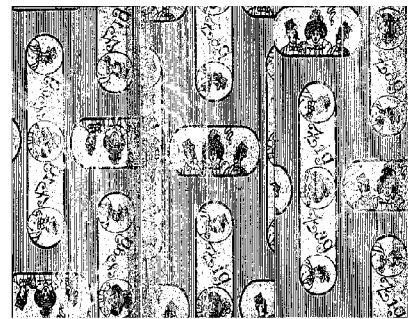
FIG. 1 shows examples of various grayscales used for the normalized oil bleed index (NOBI).
Figure 1:
Figure 1:
Figure 1:

The present disclosure provides an oil-extended olefin block copolymer (OBC) composition. An "oil-extended OBC composition," as used herein, is an OBC composition that contains an (i) OBC and (ii) at least 20 wt % oil, based on the total weight of the composition. In an embodiment, an oil-extended olefin block copolymer composition is provided and includes an olefin block copolymer, an oil, one or more polyolefin, and a filler.

1. Olefin Block Copolymer

The term "olefin block copolymer" or "OBC" is an ethylene/α-olefin multi-block copolymer and includes ethylene and one or more copolymerizable α-olefin comonomer in polymerized form, characterized by multiple blocks or segments of two or more polymerized monomer units differing in chemical or physical properties. The terms "interpolymer" and "copolymer" are used interchangeably herein. In some embodiments, the multi-block copolymer can be represented by the following formula:

$$(AB)_n$$

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

$$AAA\text{-}AA\text{-}BBB\text{-}BB$$

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The olefin block copolymer includes various amounts of "hard" and "soft" segments. "Hard" segments are blocks of polymerized units in which ethylene is present in an amount greater than about 95 weight percent, or greater than about 98 weight percent based on the weight of the polymer. In other words, the comonomer content (content of monomers other than ethylene) in the hard segments is less than about 5 weight percent, or less than about 2 weight percent based on the weight of the polymer. In some embodiments, the hard segments include all, or substantially all, units derived from ethylene. "Soft" segments are blocks of polymerized units in which the comonomer content (content of monomers other than ethylene) is greater than about 5 weight percent, or greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can be present in an OBC from about 1 weight percent to about 99 weight percent of the total weight of the OBC, or from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the OBC. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-polymers," filed on Mar. 15, 2006, in the name of Cohn L. P. Shan, Lonnie Hazlitt, et. al. and assigned to Dow Global Technologies Inc., the disclosure of which is incorporated by reference herein in its entirety. In particular, hard and soft segment weight percentages and comonomer content may be determined as described in Column 57 to Column 63 of U.S. Pat. No. 7,608,668.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetric (DSC) or equivalent technique.

The term "multi-block copolymer" or "segmented copolymer" is a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), region-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present OBC is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

In an embodiment, the OBC is produced in a continuous process and possesses a polydispersity index, PDI, from about 1.7 to about 3.5, or from about 1.8 to about 3, or from about 1.8 to about 2.5, or from about 1.8 to about 2.2. When produced in a batch or semi-batch process, the OBC possesses PDI from about 1.0 to about 3.5, or from about 1.3 to about 3, or from about 1.4 to about 2.5, or from about 1.4 to about 2.

In addition, the olefin block copolymer possesses a PDI fitting a Schultz-Flory distribution rather than a Poisson distribution. The present OBC has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present olefin block copolymer possesses a most probable distribution of block lengths. In an embodiment, the olefin block copolymer is defined as having:

(A) Mw/Mn from about 1.7 to about 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2, \text{ and/or}$$

(B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299\Delta H + 62.81 \text{ for } \Delta H \text{ greater than zero and up to 130 J/g}$$

$$\Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G'(25° C.), and a storage modulus at 100° C., G'(100° C.), wherein the ratio of G'(25° C.) to G'(100° C.) is in the range of about 1:1 to about 9:1.

The olefin block copolymer may also have:

(F) a molecular fraction which elutes between 40° C. and 130° C. when fractionated using TREF, characterized in that the fraction has a block index of at least 0.5 and up to about 1 and a molecular weight distribution, Mw/Mn, greater than about 1.3; and/or (G) average block index greater than zero and up to about 1.0 and a molecular weight distribution, Mw/Mn greater than about 1.3. It is understood that the olefin block copolymer may have one, some, all, or any combination of properties (A)-(G).

Suitable monomers for use in preparing the present OBC include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In an embodiment, the olefin block copolymer has a density from about 0.85 g/cc to about 0.89 g/cc, or from about 0.86 g/cc to about 0.88 g/cc or from about 0.870 g/cc to about 0.879 g/cc.

In an embodiment, the olefin block copolymer has a melt index (MI) from about 0.1 g/10 min to about 30 g/10, or from about 0.1 g/10 min to about 10 g/10 min, or from about 0.1 g/10 min to about 1.0 g/10 min, or from about 0.1 g/10 min to about 0.5 g/10 min or from about 0.3 g/10 min to about 0.6 g/10 min as measured by ASTM D 1238 (190° C./2.16 kg).

The olefin block copolymer has a 2% secant modulus greater than zero and less than about 150, or less than about 140, or less than about 120, or less than about 100, MPa as measured by the procedure of ASTM D 882-02.

The present OBC has a melting point of less than about 125° C. The melting point is measured by the differential scanning calorimetry (DSC) method described in WO 2005/090427 (US2006/0199930), the entire content of which is incorporated by reference herein.

In an embodiment, the olefin block copolymer contains from about 5 wt % to about 30 wt %, or from about 10 wt % to about 25 wt %, or from about 11 wt % to about 20 wt % of a hard segment. The hard segment contains from about 0.0 mol % to less than 0.9 mol % units derived from comonomer. The olefin block copolymer also contains from about 70 wt % to about 95 wt %, or from about 75 wt % to about 90 wt %, or from about 80 wt % to about 89 wt % of a soft segment. The soft segment contains less than 15 mol %, or from about 9 mol % to about 14.9 mol % units derived from comonomer. In an embodiment, the comonomer is butene or octene.

Applicants surprisingly discovered that provision of a soft segment comonomer content in the range of less than 15 mol %, or from about 9 mol % to about 14.9 mol %, unexpectedly produces a polymeric composition with no, or substantially no, tackiness or stickiness. For example, it has been found that olefin block copolymer with 18 mol % or greater comonomer content in the soft segment develops tackiness after aging at 50° C. or higher. Applicants have surprisingly discovered that lowering the soft segment comonomer content to less than 15 mol %, or from about 9 mol % to about 14.9 mol %, increases soft segment crystallinity and unexpectedly reduces stickiness or tackiness of fabricated articles.

In an embodiment, the oil-extended OBC composition includes from about 20 wt % to about 40 wt % OBC, or from about 25 wt % to about 30 wt % OBC, based on total weight of the oil extended composition. In a further embodiment, the OBC is an ethylene/octene multi-block copolymer with from about 5 wt % to about 30 wt % hard segment and from about 95 wt % to about 70 wt % soft segment, based on total weight of the copolymer. The soft segment contains from 9 mol % to 14.9 mol % units derived from octene. The OBC has an overall octene content of 6.0 mol % to 14.2 mol %.

In some embodiments, the OBC is present in an amount of 10 phr to 90 phr (2 wt % to about 36 wt % based on total weight of the oil extended composition), or in an amount of 30 phr to 70 phr (6 wt % to about 28 wt % based on total weight of the oil extended composition) or in an amount of 40 phr to 60 phr (8 wt % to about 24 wt % based on total weight of the oil extended composition), based on total elastomer being 100 phr (20 wt % to about 40 wt % based on total weight of the oil extended composition).

2. Oil

The oil-extended OBC composition includes an oil. The oil can be an aromatic oil, a mineral oil, a napththenic oil, a paraffinic oil, a triglyceride-based vegetable oil such as castor oil, a synthetic hydrocarbon oil such as polypropylene oil, a silicone oil, or any combination thereof. A nonlimiting example of a suitable oil is a white mineral oil sold under the tradename HYDROBRITE® 550.

In an embodiment, the oil-extended OBC composition contains from about 20 wt % to about 60 wt % oil, or from about 30 wt % to about 50 wt % oil. Weight percent is based on the total weight of the oil-extended OBC composition.

3. Polyolefin

The oil-extended OBC composition includes one or more polyolefin. The polyolefin may be a different OBC, a polyethylene (or ethylene-based polymer), a polypropylene (or propylene-based polymer), an EPDM and any combination thereof.

In an embodiment, the polyolefin is a polyethylene. The polyethylene is selected from ultralow density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultrahigh density polyethylene (UHDPE), and combinations thereof. In a further embodiment, the polyethylene has a density greater than 0.950 g/cc (i.e., a HDPE).

In an embodiment, the polyolefin is a polypropylene. The polypropylene is selected from random copolymer polypropylene (rcPP), impact copolymer polypropylene (hPP+at least one elastomeric impact modifier) (ICPP) or high impact polypropylene (HIPP), high melt strength polypropylene (HMS-PP), isotactic polypropylene (iPP), syndiotactic polypropylene (sPP), and combinations thereof.

In an embodiment, the polyolefin is an ethylene-propylene-diene monomer rubber (EPDM). EPDM materials are linear interpolymers of ethylene, propylene, and a nonconjugated diene such as 1,4-hexadiene, dicyclopentadiene, or ethylidene norbornene. A preferred class of interpolymers having the properties disclosed herein is obtained from polymerization of ethylene, propylene, and a non-conjugated diene to make an EPDM elastomer. Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

In some embodiments, the EPDM polymers have an ethylene content of from about 50% to about 75% by weight, a propylene content of from about 20% to about 49% by weight, and a nonconjugated diene content from about 1% to about 10% by weight, all weights based upon the total weight of the polymer. Examples of representative EPDM polymers for use include Nordel IP 4770R, Nordel 3722 IP available from The Dow Chemical Company, Midland, Mich., Vistalon 3666 available from ExxonMobil, Baton Rouge, La., and Keltan 5636A available from DSM Elastomers Americas, Addis, La.

The EPDM polymers, also known as elastomeric copolymers of ethylene, a higher-alpha-olefin and a polyene, have molecular weights from about 20,000 to about 2,000,000 daltons or more. Their physical form varies from waxy materials to rubbers to hard plastic-like polymers. They have dilute solution viscosities (DSV) from about 0.5 to about 10 dl/g, measured at 30° C. on a solution of 0.1 gram of polymer in 100 cc of toluene. The EPDM polymers also have a Mooney viscosity of greater than 50 ML(1+4) at 125° C.; and, a density of 0.870 g/cc to 0.885 g/cc or from 0.875 g/cc to 0.885 g/cc.

In some embodiments, the EPDM is present in an amount of 10 phr to 90 phr (2 wt % to about 36 wt % of the total oil-extended composition), or in an amount of 30 phr to 70 phr (6 wt % to about 28 wt % of the total oil-extended composition) or in an amount of 40 phr to 60 phr (8 wt % to about 24 wt % of the total oil-extended composition), based on total elastomer being 100 phr (20 wt % to about 40 wt % based on total weight of the oil extended composition).

In an embodiment, the oil-extended OBC composition includes from about 5 wt % to about 25 wt % polyolefin, or from about 5 wt % to about 15 wt % polyolefin. In a further embodiment, the polyolefin is HDPE.

In another embodiment, the oil-extended OBC composition includes an OBC, a polyethylene and EPDM.

4. Filler

The oil-extended OBC composition includes a filler. Nonlimiting examples of suitable fillers include talc, calcium carbonate, chalk, calcium sulfate, clay, kaolin, silica, glass, fumed silica, mica, wollastonite, feldspar, aluminum silicate, calcium silicate, alumina, hydrated alumina such as alumina trihydrate, glass microsphere, ceramic microsphere, thermoplastic microsphere, barite, wood flour, glass fibers, carbon fibers, marble dust, cement dust, magnesium oxide, magnesium hydroxide, antimony oxide, zinc oxide, barium sulfate, titanium dioxide, and titanates.

In an embodiment, the oil-extended OBC composition contains from about 10 wt % to about 50 wt % filler, or from about 20 wt % to about 30 wt % filler. In a further embodiment, the filler is calcium carbonate.

The OBC, oil, polyolefin, and the filler are compounded to form the oil-extended OBC composition such as by way of melt blending and/or extrusion blending, for example. The composition may then be molded into desired structures such as plaques, films, and/or pellets.

In an embodiment, the oil-extended OBC composition is halogen-free.

In an embodiment, the oil-extended OBC composition is phthalate-free.

Applicants surprisingly discovered that provision of (i) an OBC with a soft segment comonomer content in the range of less than 15 mol %, or from about 9 mol % to about 14.9 mol %, and (ii) a polyolefin in the present oil-extended composition and (iii) a filler unexpectedly produces an oil-extended OBC composition with no, or substantially no, tack or stickiness. The term "tack," as used herein, is the ability of one material to adhere to another material. Tack is quantified in terms of tack force. The "tack force" is a measure of the force (in Newtons) required to separate two materials in contact with each other. The measurement for tack force is described in detail in the following "test methods" section. The term "tack-free," as used herein, is a polymeric composition with a tack force of less than 0.013 N after exposure to 70° C. for one week.

After exposure to 70° C. for one week, the present oil-extended OBC composition has a tack force of 0.0 N to less than 0.1 N, or from about 0.0 N (or greater than 0.0 N) to less than about 0.05N, or from about 0.0 N (or greater than 0.0N) to less than about 0.04N, or from about 0.0 N (or greater than 0.0N) to less than 0.03N, or from about 0.0 N (or greater than 0.0N) to less than 0.02N, or from about 0.0 N (or greater than 0.0 N) to less than 0.013N.

Applicants also have surprisingly discovered that an oil-extended composition with (i) 2%-60 wt % OBC, the OBC having a soft segment comonomer content from about 9 mol % to less than 15 mol % blended with (ii) a polyolefin unexpectedly reduces oil-bleed while maintaining softness in oil-extended OBC compositions. The term "oil-bleed-out" or "oil-bleed" is the phenomenon whereby oil migrates from the interior of a polymeric component to the surface of the polymeric component. Oil-bleed makes the surface sticky and/or slippery. Oil-bleed typically results in adverse "feel" (haptics) and/or adverse "optics" (visual appearance). The term "oil exudation" is the process of oil moving from an interior location to a surface of a polymeric component. Oil exudation yields oil-bleed. In other words, oil-bleed is the end result of oil exudation. Oil-bleed is accelerated by elevated temperatures.

Oil-bleed is evaluated by way of a normalized oil-bleed index (NOBI). NOBI is an optical measurement of the amount of oil absorbed on cigarette paper from on oil-containing polymeric composition. NOBI is calculated according to the following equation:

$$\text{Normalized Oil-bleed Index}=100\cdot(\% \text{ grayscale sample}-\% \text{ grayscale control})/(100-\% \text{ grayscale control})$$

The term "% grayscale sample" is the percent grayscale measured on the aged sample and "% grayscale control" is a measurement on an unaged untreated sheet of cigarette paper. NOBI has a range from 0-100. When NOBI=100, the paper is saturated and the test does not register oil-bleed beyond that level.

In an embodiment, the oil-extended OBC composition has a normalized oil-bleed index of less than 20, or less than 10, or from 0 to less than 20, or from 0 to less than 10, or from 0 to less than 5, after 1 week at 23° C.

In an embodiment, the oil-extended OBC composition has a NOBI of less than 20, or from about 5 to less than 20, after 3 weeks at 23° C.

In an embodiment, the present composition has a NOBI of less than 50, or from 0 to less than 50, or from 0 to less than 10 after 3 weeks at 70° C.

In an embodiment, the present oil-extended OBC composition has Shore A hardness from about 40 to about 90, or from about 50 to about 90.

The disclosure provides another composition. In an embodiment, an oil-extended olefin block copolymer composition is provided and includes an OBC, an oil, a polyolefin, and a filler. The OBC is an ethylene/α-olefin multi-block copolymer with hard segments and soft segments. The soft segments contain from about 9 mol % to less than 15 mol % comonomer content. The composition has a NOBI value less than 50, or from 10 to less than 50, after exposure to 70° C. for one week, and/or after exposure to 70° C. for three weeks. The composition also has a Shore A hardness from about 50 to about 90.

In an embodiment, the composition, when exposed to 70° C. for one week exhibits a tack force less than 0.1N, or from about 0.0 N (or greater than 0.0 N) to less than about 0.05N, or from about 0.0 N (or greater than 0.0N) to less than about 0.04N, or from about 0.0 N (or greater than 0.0N) to less than 0.03N, or from about 0.0 N (or greater than 0.0N) to less than 0.02N, or from about 0.0 N (or greater than 0.0 N) to less than 0.013N.

In an embodiment, the polyolefin is a polyethylene with a density greater than 0.950 g/cc (a high density polyethylene).

In an embodiment, the composition includes from about 20 wt % to about 30 wt % OBC, from about 30 wt % to about 40 wt % oil, from about 5 wt % to about 15 wt % polyethylene, and from about 25 wt % to about 30 wt % filler. In a further embodiment, the OBC is an ethylene/octene multi-block copolymer.

The disclosure provides another composition. In an embodiment, an oil-extended olefin block copolymer is provided and includes an OBC, a polyethylene, and a filler. The OBC is an ethylene/α-olefin multi-block interpolymer with hard segments and soft segments, the soft segments containing from about 9 mol % to less than 15 mol % comonomer content. The composition has the following properties after exposure to 70° C. for one week: (i) a tack force less than 0.013N, or from 0.0 N to less than 0.013 N; and (ii) a Shore A hardness from about 40 to about 90, or from about 50 to about 70.

In an embodiment, the composition has a NOBI of less than 50, or from 0 to less than 50 after 1 week at 70° C. In a further embodiment, the composition has a NOBI of less than 50, or from 0 to less than 50, or from 0 to less than 10 after 3 weeks at 70° C.

In an embodiment, the polyethylene has a density greater than 0.95 g/cc.

In an embodiment, the composition has a compression set value from about 40% to about 70%, or from about 45% to about 65%, or from about 50% to about 60%. Compression set is measured in accordance with ASTM D 395.

Any of the foregoing oil-extended olefin block copolymer compositions may comprise two or more embodiments disclosed herein.

The OBC can be modified by such processes as e-beam or peroxide treatment in order to alter the rheology of the polymer. E-beaming and peroxide are provided as examples only and are not meant to be limiting. These treatments result in both chain scission and cross-linking events. When these events are properly balanced, for example by controlling the e-beam dose, the rheology ratio of the OBC can be increased without a significant decrease in the molecular weight of the polymer.

Any of the foregoing oil-extended olefin block copolymer compositions can be made into an article or be made into a component of an article. Nonlimiting examples of suitable articles include durable articles for the automotive, construction, medical, food and beverage, electrical, appliance, business machine, and consumer applications. In some embodiments, the compositions are used to manufacture flexible durable parts or articles selected from toys, grips, soft touch handles, bumper rub strips, floorings, auto floor mats, wheels, casters, furniture and appliance feet, tags, seals, gaskets such as static and dynamic gaskets, automotive doors, bumper fascia, grill components, rocker panels, hoses, linings, office supplies, seals, liners, diaphragms, tubes, lids, stoppers, plunger tips, delivery systems, kitchen wares, shoes, shoe bladders and shoe soles. In some embodiments, the compositions are used to manufacture durable parts or articles that require a high tensile strength and low compression set. In further embodiments, the compositions are used to manufacture durable parts or articles that require a high upper service temperature and a low modulus.

DEFINITIONS

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 97 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, reference melt index, melt flow rate, and other properties.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

Normalized oil-bleed index (NOBI) is an optical measurement of the amount of oil absorbed on cigarette paper from an oil-containing polymer composition.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

Test Methods

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from injection molded plaques that are 4" by 6" by 0.125". Compression set is measured after 24 hours at 25% strain at 70° C. or 23° C.

Density is measured in accordance with ASTM D 792.

Differential scanning calorimetry (DSC) is performed on compression molded specimens using a TA Instruments Q100 or Q1000 DSC and a crimp-sealed Perkin Elmer pan. Samples are equilibrated at −90° C. for 5 min, then heated at 10° C./min to 180° C. (capturing the "$1^{st}$ Heat DSC Curve"), held for 5 min, then cooled at 10° C./min. to −90° C. (capturing the "crystallization curve"), held for 5 minutes, then heated at 10° C./min to 180° C. (capturing the "$2^{nd}$ Heat DSC Curve"). The data is analyzed using TA Universal Analysis software after run completion.

Melt Index (MI) is measured in accordance with ASTM D 1238, Condition 190° C./2.16 kg.

Normalized oil-bleed index (NOBI) is an optical measurement to compare oil-bleed characteristics. Molded plaques are aged for 24 hrs, 1 week, and 3 weeks (at 23° C. and 70° C.) while resting on sheets of ZigZag™ cigarette paper (available from ZigZag Corp.). After aging, the cigarette paper is removed and optically scanned against a black background to measure the extent of oil-bleed.

The scanning is performed using the Xerox WorkCentre M118i copier/fax/scanner. The image is scanned in "Text" mode at 200 dpi, and saved as a TIFF file. The TIFF file is opened in MS Paintbrush, cropped on two sides, then saved. The image is then opened in Photoshop CS2 (v.9) and cropped on the other two sides. The TIFF file is opened in MS Paintbrush, cropped on two sides, then saved. The "text mode" image is a bi-tonal image. The percentage of black pixels in the image is the desired result. The text mode image is obtained in this software by first converting it to an 8-bit grayscale image so that a grayscale histogram could be created, with just 2 levels of grayscale, 0 (black) to 255 (white). The percentile of the 0 grayscale level in the histogram is the same as the percentage of black pixels. (This value is called "% gray scale" but may more accurately be described as "% black pixels" in the bi-tonal image).

A normalized oil-bleed index (NOBI) is calculated according to the following equation:

Normalized Oil-bleed Index=100·(% grayscale sample−% grayscale control)/(100−% grayscale control)

The term "% grayscale sample" is the percent grayscale measured on the aged sample and "% grayscale control" is a measurement on an un-aged, untreated sheet of cigarette paper. NOBI has a range from 0 to 100. When NOBI=100, the paper is saturated and the test does not register oil-bleed beyond that level. FIG. 1 shows four examples of grayscale: 20.1%, 34.6%, 51.6%, and 100% grayscale.

Shore A hardness is measured on molded plaques in accordance with ASTM D 2240. This test method permits hardness measurements based on either initial indentation or indentation after a specified period of time, or both. In this case, a specified time of 10 seconds is used.

Small angle x-ray scattering (SAXS) data are collected using a Rigaku Micro Source X-ray Generator with Cu radiation and a 2D area detector. The samples are positioned in the beam using a precision step motor controlled via PC using Labview software. Data are analyzed using SCATTER and are corrected for air background.

Tack Force is measured as follows. Samples are compression molded or injection molded into plaques with a thickness of 0.125 inches. Samples are cut into 1"×6" strips and marked in 1" intervals. Samples are aged at elevated temperature if warranted. Mylar® sheets are cut into 1"×6" strips, formed into loops with dimensions of 1"×5". After aging, the samples are cooled to room temperature. Double-sided tape is used to affix the specimen to platform to prevent it from rising up off the surface. The loop is placed into the pneumatic grips of Instron™ 5564 and aligned parallel to the plaque. The loop is lowered at a rate of 300%/minute covering the 1"×1" surface of the plaque. A new loop is used with each measurement taken. The Average Tack Force (N) and standard deviation are reported after five readings per specimen. One measurement is taken per each 1"×1" portion of a sample.

Surface Roughness

Surface roughness is created on a mold by sanding a mirror-finished plate. The surface roughness of the mold is measured using a profilometer (Dektak 150 stylus profilometer) using the following parameters. Surface roughness is measured both in a direction parallel to and perpendicular to the sanding direction. Surface roughness values reported are Ra, average roughness, for the perpendicular direction. Ra (Average Roughness), formerly known as Arithmetic Average (AA) and Center Line Average (CL), is the arithmetic average deviation from the mean line within the assessment length.

Ten line scans per sample
Scan Type Standard Scan
Stylus Radius: 2.5 µm
Scan Length 15000.0 µm
Duration 90 sec
Resolution 0.556 µm/sample
Force 1.00 mg
Measurement Range 524 µm
Profile Hills&Valleys
Display Range Auto
Short Pass Filter Cutoff 100.0 µm
Long Pass Filter Cutoff 1500.0 µm R. Cursor Pos: 100.0 µm Width: 40.0 µm
M. Cursor Pos: 14750.0 µm Width: 40.0 µm By way of example and not by limitation, examples of the present disclosure will now be provided.

EXAMPLES

1. Materials

A. Olefin Block Copolymer

Olefin block copolymer is available from The Dow Chemical Company (Midland, Mich.).

(i) INFUSE™ 9007-0.5 g/10 min MI, 0.866 g/cc density olefin block copolymer (OBC), with 11/89 hard/soft segment split by weight percent and 18 mol % octene in the soft segment, and 15.6 mol % total octene.

(ii) INFUSE™ 9000-0.5 g/10 min MI, 0.877 g/cc density OBC, with 25/75 hard/soft segment split by weight percent, 18 mol % octene in the soft segment, and 12.7 mol % total octene.

(iii) OBC 3-0.5 g/10 min MI, 0.877 g/cc density OBC, 130 ppm Zn, with 11/89 hard/soft segment split by weight percent, 13 mol % octene in the soft segment, 11.2 mol % total octene. The properties for three OBCs are shown in Table 1 below.

TABLE 1

| Property | Method | | INFUSE 9007 | INFUSE 9000 | OBC 3 |
|---|---|---|---|---|---|
| Melt Index | dg/min | ASTM D 1238 | 0.5 | 0.5 | 0.5 |
| Density | g/cm³ | ASTM D 792 | 0.866 | 0.877 | 0.877 |
| Melting Point | ° C. | DSC | 120 | 120 | 120 |
| Tg | ° C. | DSC | −60 | −60 | −54 |
| Hardness | Shore A | ASTM D 2240 | 60 | 75 | 76 |
| 100% Modulus | MPa | ASTM D 1708 | 1.4 | 2.6 | 2.8 |
| Ultimate Tensile Strength | MPa | ASTM D 1708 | 11.1 | 14.1 | 19.7 |
| Tensile Elongation | % | ASTM D 1708 | 1560 | 1270 | 975 |
| Compression Set, 23° C. | % | ASTM D 395 | 17 | 15 | 23 |
| Compression Set, 70° C. | % | ASTM D 395 | 53 | 40 | 60 |

B. Oil

Hydrobrite 550 (Sonnebom)—mineral oil with nominal 70% paraffinic and 30% naphthenic content, and average 541 MW.

C. Polyolefin

Dow DMDA-8920 NT 7 (Dow HDPE 8920) is a high density polyethylene available from The Dow Chemical Company, Dow HDPE 8920 has a density of 0.954 g/cc, MI of 20 g/10/min, and a melting point of 130° C.

Dow hPP 700-12 is a polypropylene available from The Dow Chemical Comopany. Dow hPP 700-12 has a density of (1900 g/cc (ASTM D792), and a melt flow rate of 12 (230° C./2.16 kg, ASTMD1238).

NORDEL IP 4770 is an ethylene-propylene-diene monomer rubber (EPDM) available from The Dow Chemical Company (Midland, Mich.) and has the following properties: density of 0.872 glee, Mooney viscosity (ML 1+4, 257 F) of 70, ethylene content of 70 wt % and ENB content of 5 wt %.

Vistalon 3666 is an EPDM available from ExxonMobil Chemical Company (Houston, Tex.) and has the following properties: Mooney viscosity of 52, ethylene content of 64 wt %, and ENB content of 4.5 wt %.

D. Filler

Calcium carbonate—Atomite (available from IMERYS Performance Minerals)

2. Preparation

The compositions of Samples A', B', 1, 2 and 3 are provided in Table 2 below. Samples A and B are comparative. Amounts are given in weight percent based on total weight of the composition.

TABLE 2

|  | Sample # | | | | |
|---|---|---|---|---|---|
|  | A' 61 Shore A | B' 53 Shore A | 1 53 Shore A | 2 62 Shore A | 3 70 Shore A |
| KRATON G1651 E | 22.0 | 0 | 0 | 0 | 0 |
| INFUSE 9007 | 0 | 27.1 | 0 | 0 | 0 |
| OBC 3 | 0 | 0 | 28.2 | 27.0 | 26.0 |
| Oil (Hydrobrite 550) | 41.8 | 35.1 | 36.6 | 35.2 | 33.7 |
| Filler (Atomite $CaCO_3$) | 21.7 | 27.0 | 28.2 | 27.0 | 26.0 |
| Polyolefin (DOW HDPE 8920) | 0 | 0 | 7.0 | 10.8 | 14.3 |
| Polyolefin (DOW hPP 700-12) | 14.3 | 10.8 | 0 | 0 | 0 |

Samples 1-3 of Table 2 are compounded by way of a Werner & Pleiderer ZSK-30 twin screw extruder, and a Zenith pump powered by a Dayton DC motor. Samples 1-3 are pelletized with a Gala LPU lab underwater pelleting system. The processing conditions are provided in Tables 3-4 below.

TABLE 3

| Compounding Conditions | | | | | |
|---|---|---|---|---|---|
|  |  | Sample # | | | |
|  |  | 1 Shore A 53 | 2 62 | 3 70 |
| Zone 1 Temp/Feed | ° C. | n/a | n/a | n/a |
| Zone 2 Temp | ° C. | 120 | 122 | 119 |
| Zone 3 Temp | ° C. | 175 | 172 | 168 |
| Zone 4 Temp | ° C. | 170 | 175 | 172 |
| Zone 5 Temp | ° C. | 165 | 166 | 168 |
| Die Temp | ° C. | 140 | 119 | 111 |
| Adaptor | ° C. | 150 | 150 | 150 |
| Pelletizer RPM | rpm1 | 400 | 1400 | 1400 |
| Die Pressure | psig | 147 | 157 | 161 |
| Melt temp | ° C. | 147 | 157 | 161 |
| Extruder RPM | rpm | 202 | 202 | 200 |
| Extruder Torque | % | 44 | 42 | 44 |
| Feeder #1 | lb/hr | 7.0 | 7.9 | 8.7 |
| Feeder #2 | lb/hr | 5.6 | 5.6 | 5.6 |
| Oil pump #1 | lb/hr | 5.1 | 5.1 | 5.1 |
| Oil pump #2 | lb/hr | 2.2 | 2.2 | 2.2 |
| Total Run Rate | lb/hr | 19.9 | 20.8 | 21.6 |

Samples 1-3 are molded into 4"×6"×0.125" minor polished plaques under the following conditions shown in Table 4 below.

TABLE 4

| Injection Molding Conditions | | |
|---|---|---|
|  |  | All Samples |
| Temperatures | | |
| Zone 1 Temp° | ° C. | 204 |
| Zone 2 Temp° | ° C. | 204 |
| Zone 3 Temp° | ° C. | 204 |
| Zone 4 Temp° | ° C. | 204 |
| Nozzle Temp | ° C. | 204 |
| Molded Temperature | ° C. | 16 |
| Extruder | | |
| RPM | m/min | 30 |
| Back Pressure | Bar | 15 |
| Dosage | $cm^3$ | 70 |
| Optimal Injection | | |
| Injection Speed | $cm^3$/sec | 25 |
| Transfer Position | $cm^3$ | 15 |
| Pressure at Transfer | Bar | 264 |
| Fill Time | sec | 2.37 |
| Cushion | $cm^3$ | 6.2 |
| Hold | | |
| Pressure | Bar | 275 |
| Time | | |
| Hold Time | sec | 50 |
| Cool Time | sec | 20 |
| Dosage | sec | 6.2 |
| Cycle Time | sec | 79.5 |

Figure 2:
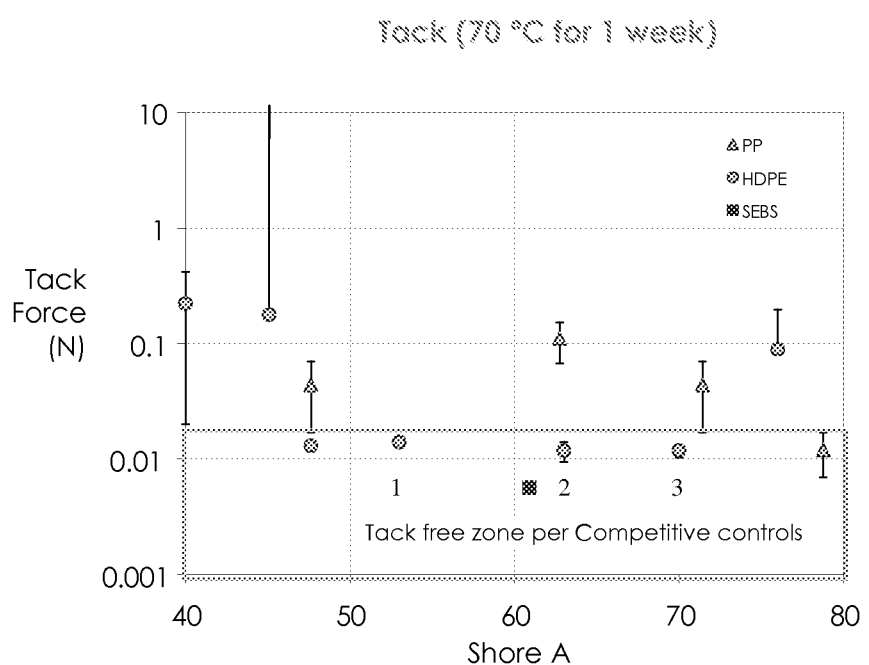
FIG. 2 is a graph showing the tack force and Shore A hardness values for various comparative and inventive oil extended compositions.

FIG. 2 shows the tack force and Shore A hardness values for Samples 1-3 after exposure to 70° C. for 1 week. Also shown in FIG. 2 is a tack-free zone as indicated by the upper horizontal line of the box which indicates a tack force of 0.013 N. Samples below this line are tack-free.

Figure 3:
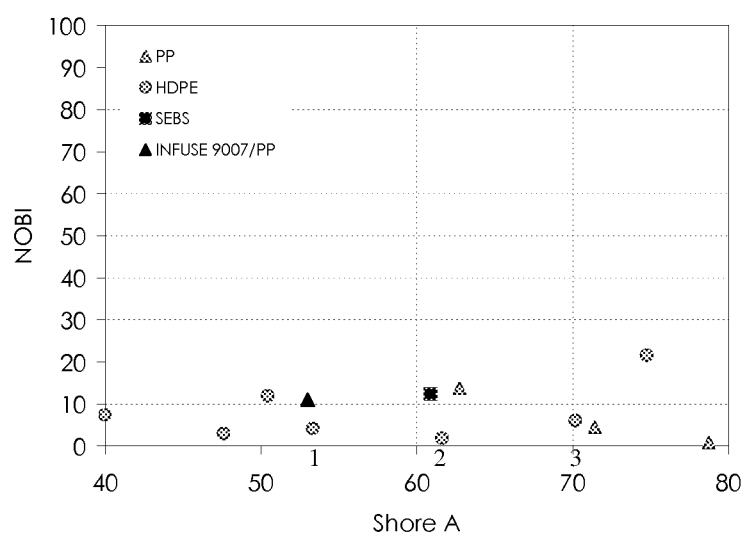
FIG. 3 is a graph showing NOBI and Shore A hardness values for various comparative and inventive oil extended compositions.

FIG. 3 shows NOBI and Shore A hardness values for Samples 1-3 after exposure to 23° C. for 3 weeks.

Figure 4:
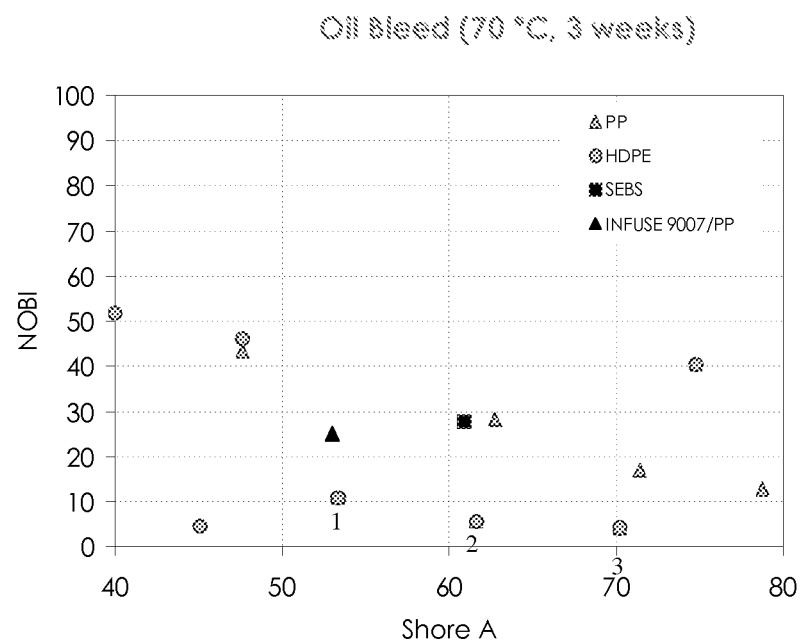
FIG. 4 is a graph showing NOBI and Shore A hardness values for various comparative and inventive oil extended compositions.

FIG. 4 shows NOBI and Shore A hardness values for Samples 1-3 after exposure to 70° C. for 3 weeks.

Figure 5:
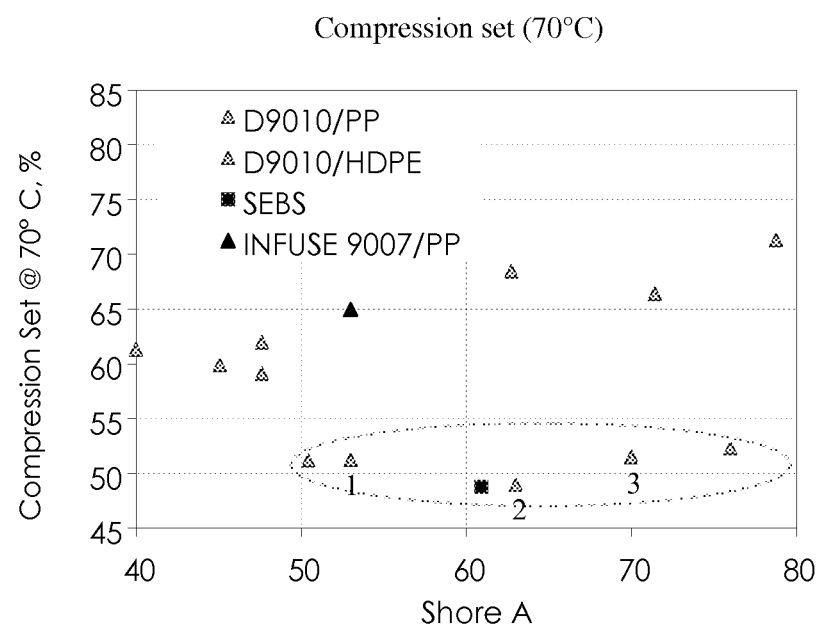
FIG. 5 is a graph showing compression set and Shore A hardness values for various comparative and inventive oil extended compositions.

FIG. 5 shows the compression set (%) and Shore A hardness values for Samples 1-3 after exposure to 70° C. for 24 hours.

The data in FIGS. 2-5 show Samples 1-3 with low tack (or tack-free), with low oil bleed (NOBI less than 50), and softness (Shore A 50-90).

Table 5 shows the properties of Samples A, B and 1-3.

TABLE 5

| Properties of Samples A', B' and 1-3 | | | | | |
|---|---|---|---|---|---|
|  | A' | B' | 1 | 2 | 3 |
| Tack Force (70° C., 1 week) [N] | 0.0057 | 0.4429 | 0.0141 | 0.0118 | 0.0118 |
| NOBI (23° C., 3 weeks) | 12 | 7 | 4 | 2 | 6 |
| NOBI (70° C., 3 weeks) | 28 | 44 | 11 | 6 | 4 |

TABLE 5-continued

Properties of Samples A', B' and 1-3

|  | A' | B' | 1 | 2 | 3 |
|---|---|---|---|---|---|
| Compression Set, 23° C. | 24 | 27 | 23 | 29 | 31 |
| Compression Set, 70° C. | 49 | 71 | 51 | 49 | 52 |
| Tensile Strength, psi | 1076 | 421 | 554 | 650 | 774 |
| Tensile stress at 100%, psi | 272 | 229 | 203 | 291 | 403 |

Examples Set 2

The following set of Samples are prepared similarly to Samples 1-3. Tables 6 and 7 show formulations and properties of Samples with 160 phr oil and 190 phr oil respectively.

TABLE 6

Formulations (in phr) and Properties with 160 phr Oil

|  | 4 | 5 | 6 | 7 | 8 | 9 | 10 |
|---|---|---|---|---|---|---|---|
| OBC 3 | 50 | 50 | 50 | 50 | 100 | 100 | 100 |
| EPDM 1 (NORDEL IP 4770) | 50 | 50 | 50 | 50 | 0 | 0 | 0 |
| HDPE 8920 | 25 | 40 | 55 | 70 | 25 | 40 | 55 |
| hPP 700-12 | — | — | — | — | — | — | — |
| Oil - Hydrobrite 550 | 160 | 160 | 160 | 160 | 160 | 160 | 160 |
| Filler Atomite CaCO$_3$ | 100 | 100 | 100 | 100 | 100 | 100 | 100 |
| Hardness, Shore A | 50 | 56 | 63 | 68 | 45 | 55 | 64 |
| Tack (70° C., 1 week) | 0.0221 | 0.0064 | 0.0063 | 0.0058 | 0.0208 | 0.0185 | 0.0524 |
| NOBI (23 C., 3 weeks) | 0 | 4 | 3 | 7 | 16 | 1 | 17 |
| NOBI (70° C., 3 weeks) | 8 | 11 | 1 | 10 | 3 | 14 | 15 |
| Compression Set, 23° C. | 24 | 27 | 29 | 28 | 24 | 25 | 27 |
| Compression Set, 70° C. | 57 | 56 | 61 | 55 | 56 | 58 | 58 |
| Tensile Strength, psi | 409 | 507 | 558 | 635 | 476 | 554 | 644 |
| Tensile stress at 100%, psi | 167 | 232 | 280 | 341 | 161 | 213 | 288 |
| Rheology Ratio | 4.7 | 5.4 | 5.5 | 4.5 | 2.6 | 2.6 | 2.6 |

|  | 11 | A | B | C | D | E |
|---|---|---|---|---|---|---|
| OBC 3 | 100 | 0 | 0 | 0 | 0 | 50 |
| EPDM 1 (NORDEL IP 4770) | 0 | 100 | 100 | 100 | 100 | 50 |
| HDPE 8920 | 70 | 25 | 40 | 55 | 70 | — |
| hPP 700-12 | — | — | — | — | — | 40 |
| Oil - Hydrobrite 550 | 160 | 160 | 160 | 160 | 160 | 160 |
| Filler Atomite CaCO$_3$ | 100 | 100 | 100 | 100 | 100 | 100 |
| Hardness, Shore A | 70 | 47 | 54 | 63 | 68 | 61 |
| Tack (70° C., 1 week) | 0.0367 | 0.0073 | 0.0069 | 0.0055 | 0.0072 | 0.1200 |
| NOBI (23 C., 3 weeks) | 4 | 8 | 9 | 2 | 8 | -4 |
| NOBI (70° C., 3 weeks) | 53 | 17 | 8 | 2 | 7 | 16 |
| Compression Set, 23° C. | 28 | 23 | 24 | 24 | 28 | 24 |
| Compression Set, 70° C. | 54 | 67 | 64 | 58 | 53 | 80 |
| Tensile Strength, psi | 714 | 388 | 464 | 510 | 573 | 295 |
| Tensile stress at 100%, psi | 343 | 155 | 200 | 265 | 322 | 824 |
| Rheology Ratio | 2.6 | 8.0 | 7.9 | 7.5 | 8.2 | 9.7 |

TABLE 7

Formulations (in phr) and Properties with 190 phr Oil

|  | F | G | H | I | J | 12 | 13 | 14 | K | 15 |
|---|---|---|---|---|---|---|---|---|---|---|
| OBC 3 | 0 | 0 | 0 | 0 | 50 | 50 | 50 | 50 | 50 | 50 |
| EPDM 1 (NORDEL IP 4770) | 100 | 100 | 100 | 100 | 50 | 50 | 50 | 50 | 0 | 0 |
| EPDM 2 (Vistalon 3666) | 0 | 0 | 0 | 0 | 0 | 0 | 0 | 0 | 88 | 88 |
| HDPE 8920 | 25 | 40 | 55 | 70 | 25 | 40 | 55 | 70 | 25 | 70 |
| Oil - Hydrobrite 550 | 190 | 190 | 190 | 190 | 190 | 190 | 190 | 190 | 153 | 153 |
| Filler - Atomite CaCO3 | 100 | 100 | 100 | 100 | 100 | 100 | 100 | 100 | 100 | 100 |
| Hardness, Shore A | 44 | 53 | 55 | 65 | 48 | 53 | 57 | 64 | 36 | 60 |
| Tack Force (70° C., 1 week) [N] | 0.0843 | 0.0448 | 0.0556 | 0.0077 | 0.0312 | 0.0196 | 0.0129 | 0.0191 | 0.1590 | 0.0081 |
| NOBI 23° C. (3 weeks) | 11 | 11 | 2 | 8 | 13 | 5 | 10 | 11 | 9 | 6 |
| NOBI 70° C. (3 weeks) | 12 | 13 | 4 | 3 | 4 | 0 | 11 | 40 | 11 | 26 |
| Compression Set (23° C.) [%] | 23 | 28 | 28 | 37 | 26 | 27 | 31 | 33 | 26 | 30 |
| Compression Set (70° C.) [%] | 72 | 64 | 65 | 58 | 62 | 59 | 58 | 57 | 51 | 53 |

TABLE 7-continued

Formulations (in phr) and Properties with 190 phr Oil

|  | F | G | H | I | J | 12 | 13 | 14 | K | 15 |
|---|---|---|---|---|---|---|---|---|---|---|
| Tensile Stress at 100% [psi] | 143 | 194 | 202 | 292 | 160 | 188 | 255 | 345 | 138 | 264 |
| Tensile Strength [psi] | 544 | 558 | 583 | 635 | 492 | 538 | 612 | 696 | 349 | 503 |
| Rheology Ratio | 14.0 | 10.9 | 33.3 | 13.3 | 6.4 | 5.8 | 4.7 | 9.2 | 30.2 | 9.6 |

Figure 6:
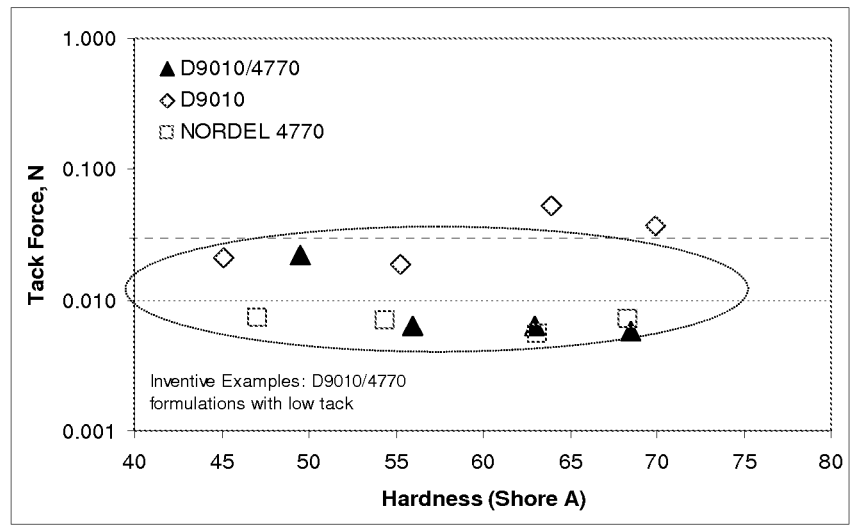
FIG. 6 shows Tack Force data for Examples 4-11 and Comparative Examples A-E.
Figure 7:
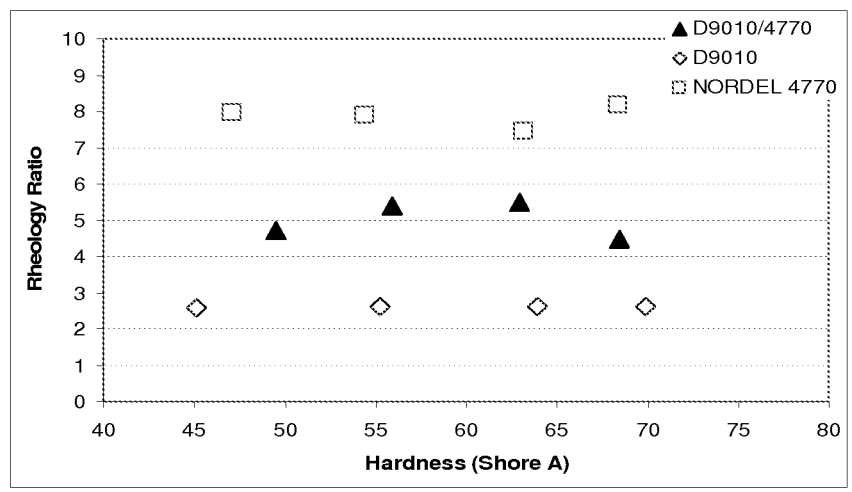
FIG. 7 shows Rheology Ratio (ratio of viscosity determined by DMS at 190° C. at 100 s$^{-1}$ to that at 0.1 s$^{-1}$) for Examples 4-11 and Comparative Examples A-E.
Figure 9:
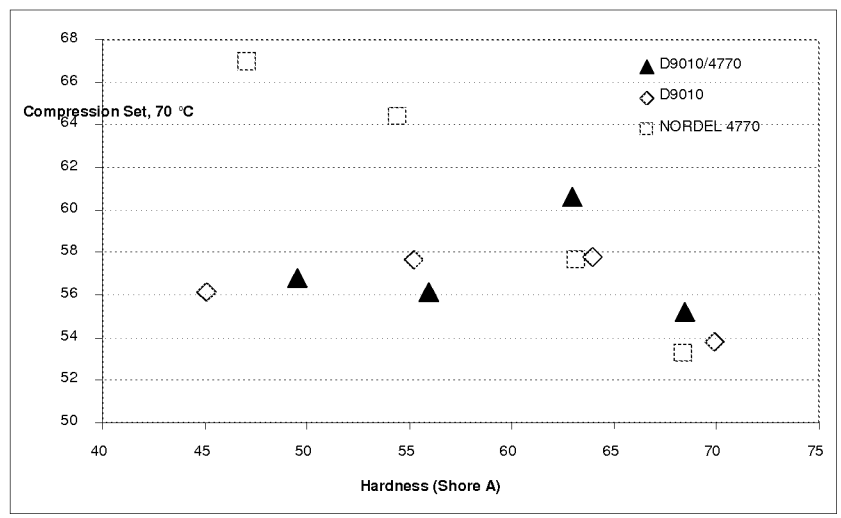
FIG. 9 shows Compression Set at 70° C. for Examples 4-11 and Comparative Examples A-E.
Figure 10:
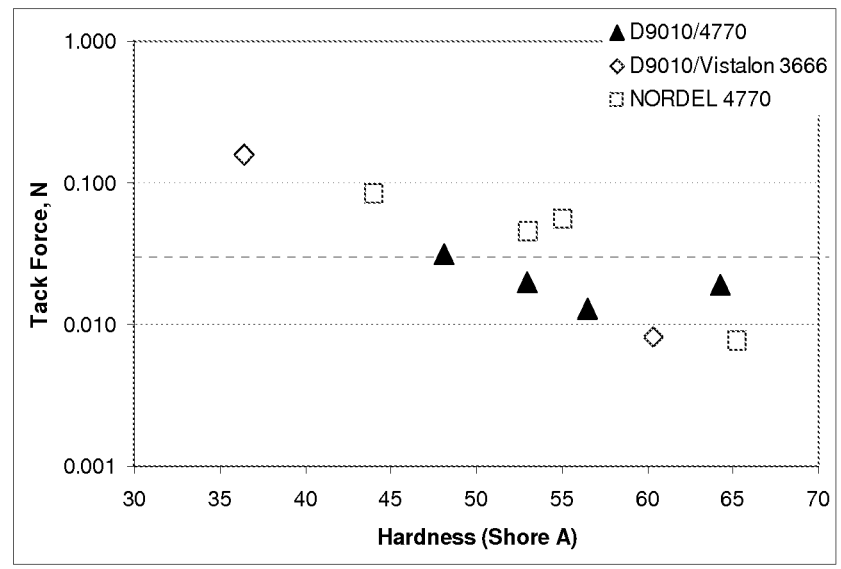
FIG. 10 shows Tack Force Data for Examples 12-15 and Comparative Examples F-K.
Figure 11:
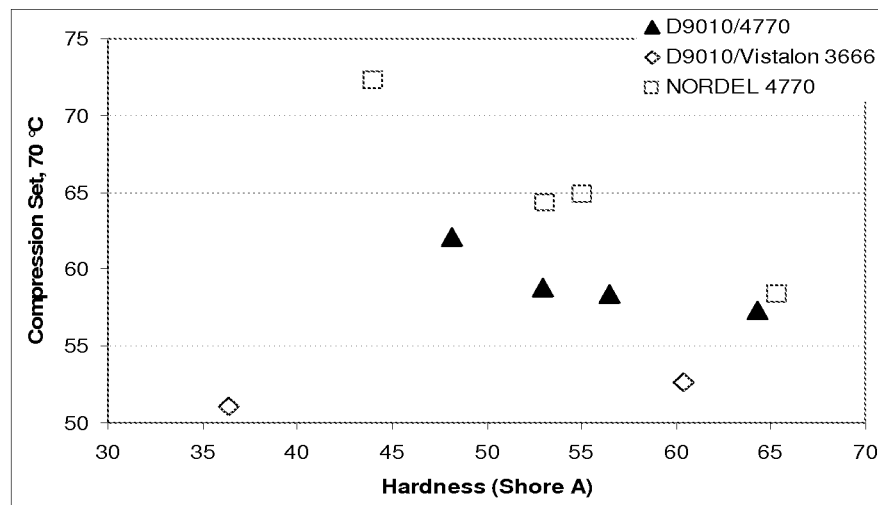
FIG. 11 shows Compression Set at 70° C. for Examples 12-15 and Comparative Examples F-K.
Figure 12:
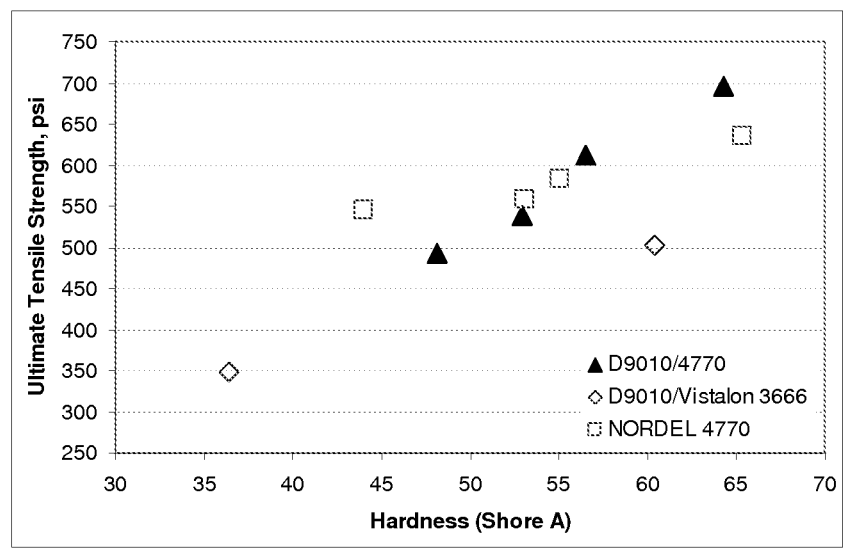
FIG. 12 shows Ultimate Tensile Strength for Examples 12-15 and Comparative Examples F-K.

As shown in FIG. 6 and FIG. 9, the inventive examples 4-11 from Table 5 with 160 phr oil have low tack and low compression set. The inventive examples combine the advantage of the formulations made with NORDEL 4770 (EPDM), i.e. low tack and high rheology ratio, with the advantage of the formulations made with OBC, i.e. low compression set in low Shore A range. In general, the formulations made with OBC or OBC+EPDM have the lowest compression set values in the range of Shore A materials prepared. Meanwhile, low tack performance is achieved for the EPDM formulations and the OBC/EPDM formulations down to about 50 Shore A. Examples 12-15 with 190 phr oil are shown in Table 6. Again, a combination of low tack and low compression set is achieved with the inventive examples formulated with OBC/EPDM blends. The tack and compression set data for the examples in Table 6 are shown in FIG. 10 and FIG. 11.

Figure 8:
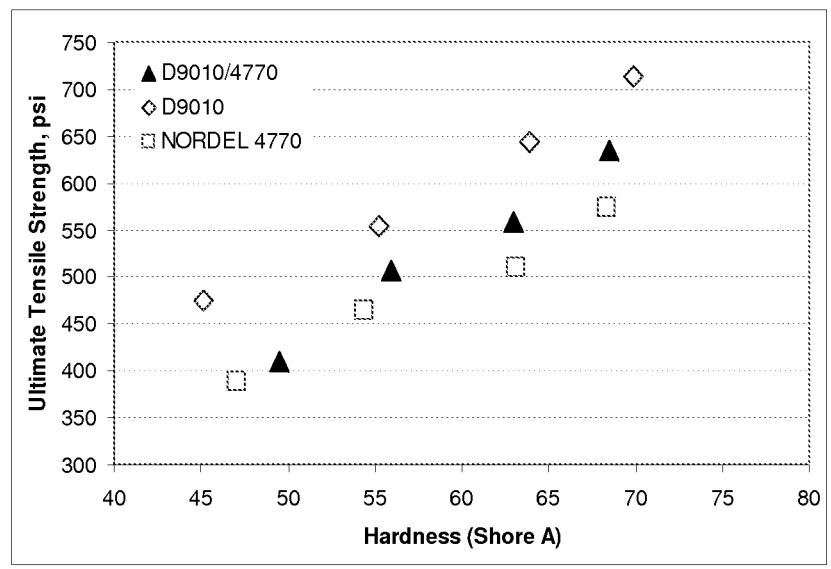
FIG. 8 shows Ultimate Tensile Strength for Examples 4-11 and Comparative Examples A-E.

This inventive combination of low tack, and low compression set is unexpected especially when other properties are considered. For a property such as ultimate tensile strength, property values that are close to the mean values between the two single-component elastomer cases are obtained (see FIG. 8), rather than values that are close to those of one single-component elastomer case or the other.

Examples of Effect of Surface Texture

Examples of the effect of surface texture on tack for two different compounds are shown in Table 8 below. As shown, when textured molds are used, the tack force is significantly lower. The level of surface roughness required to achieve low tack varies with the formulation, but as illustrated a mold with 0.41 μm roughness results in low tack for both formulations. The molding conditions used for these examples are included below. Note that these molding conditions differ from those used in the other examples.

TABLE 8

|  |  | L | 16 | 17 | M | N | 18 |
|---|---|---|---|---|---|---|---|
| Composition (phr) | OBC 3 | 100 | 100 | 100 | 100 | 100 | 100 |
|  | Hydrobrite 550 | 130 | 130 | 130 | 130 | 130 | 130 |
|  | Atomite CaCO3 | 100 | 100 | 100 | 100 | 100 | 100 |
|  | HDPE 8920 | 25 | 25 | 25 | 40 | 40 | 40 |
|  | Mold Ra (μm) | mirror | 0.29 | 0.41 | mirror | 0.29 | 0.41 |
| Properties | Plaque Ra (μm) | 0.12 | 0.28 | 0.49 | 0.12 | 0.25 | 0.41 |
|  | Hardness, Shore A | 53 | 53 | 53 | 62 | 62 | 62 |
|  | Tack Force (70° C., 1 week) [N] | 0.720 | 0.008 | 0.008 | 0.814 | 0.482 | 0.012 |
|  | Tack Stdev | 0.306 | 0.001 | 0.004 | 0.082 | 0.189 | 0.011 |

TABLE 9

Typical molding conditions

| Barrel and Mold Temperatures | |
|---|---|
| Hopper zone (° C.) | 38 |
| Zone 1 Temperature (° C.) | 121 |
| Zone 2 Temperature (° C.) | 232 |

TABLE 9-continued

Typical molding conditions

| Zone 3 Temperature (° C.) | 232 |
|---|---|
| Zone 4 Temperature (° C.) | 232 |
| Zone 5 Temperature (° C.) | 232 |
| Nozzle Temperature (° C.) | 170 |
| Mold Temperature (° F.) | 120 |
| Extruder | |
| RPM (1/min) | 150 |
| Backpressure (Bar) | 15 |
| Plast. Time (s) | 7.97 |
| Dosage (ccm) | 80 |
| Suckback (ccm) | 5 |
| Optimal Injection | |
| Injection Speed #1 (ccm/s) | 25 |
| Injection pressure #1 (bar) | 2000 |
| Injection Time #1 (s) | 2.62 |
| Switch Over Position (ccm) | 20 |
| Switch over melt pressure (bar) | 339 |
| Max Melt pressure (bar) | 344 |
| Cushion (ccm) | 15.7 |
| Hold | |
| Hold Pressure (Bar) | 200 |
| Hold Time (s.) | 30 |
| Time | |
| Cool Time (s.) | 20 |
| Cycle Time (s.) | 61 |

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A molded article, comprising:
an oil-extended olefin block copolymer composition including
from about 10 wt % to about 30 wt % of an ethylene/octene multi-block copolymer comprising about 5 wt % to about 20 wt % of hard segments and from 80 wt % to 95 wt % of soft segments, the soft segments comprising from 9 mol % to 14.9 mol % units derived from octene, and the ethylene/octene multi-block copolymer comprising an overall octene content of 6.0 mol % to 14.2 mol %, from about 30 wt % to about 45 wt % of an oil, from about 5 wt % to about 20 wt % of one or more polyolefin, and from about 10 wt % to about 50 wt % of a filler; and wherein after exposure to 70° C. for one week the article has a tack force less than 0.1N, after exposure to 70° C. for three weeks the article has a normalized oil bleed index of less than 50, and the article has a Shore A hardness from about 40 to about 90, wherein the one or more polyolefin is a polyethylene with a density greater than 0.950 g/cc; and wherein the oil is selected from the group consisting of a non-aromatic mineral oil, a naphthenic oil, a paraffinic oil, or any combination thereof.

2. The molded article of claim 1, wherein about 20 wt % to about 40 wt % of the filler is present.

3. The molded article of claim 1, wherein the normalized oil bleed index is from 1 to less than 10.

4. The molded article of claim 1, wherein the ethylene/octene multi-block copolymer has a density from about 0.86 g/cc to about 0.88 g/cc.

5. The molded article of claim 1, wherein the tack force is less than 0.020N.

6. The molded article of claim 1, wherein a compression set value is from about 40% to about 70%, as measured in accordance with ASTM D 395.

7. The molded article of claim 1, further comprising an ethylene-propylene-diene monomer rubber.

* * * * *